United States Patent
Milewski

(10) Patent No.: US 9,613,313 B2
(45) Date of Patent: Apr. 4, 2017

(54) SYSTEM AND METHOD FOR PROVIDING A RECOMMENDATION OF A GAME BASED ON A GAME-CENTRIC RELATIONSHIP GRAPH

(71) Applicant: DeNa Co., Ltd., Tokyo (JP)

(72) Inventor: Robert J. Milewski, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 64 days.

(21) Appl. No.: 14/431,748

(22) PCT Filed: Sep. 26, 2012

(86) PCT No.: PCT/JP2012/075590
§ 371 (c)(1),
(2) Date: Mar. 26, 2015

(87) PCT Pub. No.: WO2014/049884
PCT Pub. Date: Apr. 3, 2014

(65) Prior Publication Data
US 2015/0278692 A1    Oct. 1, 2015

(51) Int. Cl.
*G06F 17/00* (2006.01)
*G06N 5/02* (2006.01)
(Continued)

(52) U.S. Cl.
CPC .......... *G06N 5/04* (2013.01); *A63F 13/12* (2013.01); *G06F 17/30958* (2013.01); *G06Q 30/02* (2013.01); *G06Q 30/0631* (2013.01); *H04L 67/42* (2013.01); *A63F 2300/556* (2013.01); *A63F 2300/5566* (2013.01);
(Continued)

(58) Field of Classification Search
None
See application file for complete search history.

(56) References Cited

U.S. PATENT DOCUMENTS

| 2012/0101890 | A1 | 4/2012 | Matsushita et al. |
| 2013/0132309 | A1* | 5/2013 | Kvernvik ............. G06N 99/005 706/12 |

(Continued)

FOREIGN PATENT DOCUMENTS

| JP | 2008-282098 | 11/2008 |
| JP | 2011227886 | 11/2011 |

(Continued)

OTHER PUBLICATIONS

PCT International Search Report of International Application No. PCT/JP2012/075590 dated Jan. 8, 2013 (3 pages).

*Primary Examiner* — Kakali Chaki
*Assistant Examiner* — Ababacar Seck
(74) *Attorney, Agent, or Firm* — Pillsbury Winthrop Shaw Pittman LLP

(57) ABSTRACT

One aspect of the present disclosure relates to a system for providing a recommendation for a game based on a game-centric relationship graph. The relationship graph is a graph depicting relationships between game and game users. One or more recommended games may be determined by leveraging the relationship graph. For example, recommended games may be identified based on graph proximities from candidate game nodes to a target user node or a mathematical score calculated from weight metrics of relationship branches.

11 Claims, 3 Drawing Sheets

(51) Int. Cl.
    *G06N 5/04*           (2006.01)
    *G06Q 30/02*         (2012.01)
    *A63F 13/30*         (2014.01)
    *G06Q 30/06*         (2012.01)
    *G06F 17/30*         (2006.01)
    *H04L 29/06*        (2006.01)
    *G06N 99/00*        (2010.01)
    *G06N 5/00*          (2006.01)
    *G06Q 50/00*        (2012.01)

(52) U.S. Cl.
    CPC .............. *G06N 5/003* (2013.01); *G06N 5/02* (2013.01); *G06N 99/005* (2013.01); *G06Q 50/01* (2013.01)

(56) References Cited

U.S. PATENT DOCUMENTS

2013/0165234 A1*   6/2013   Hall ..................... A63F 13/00
                                                                    463/42
2014/0019240 A1*   1/2014   Zhou ................ G06Q 30/0203
                                                                    705/14.53

FOREIGN PATENT DOCUMENTS

| JP | 2012150561 | 8/2012 |
|----|------------|--------|
| WO | 2011122575 | 10/2011 |

* cited by examiner

SYSTEM AND METHOD FOR PROVIDING A RECOMMENDATION OF A GAME BASED ON A GAME-CENTRIC RELATIONSHIP GRAPH

TECHNICAL FIELD

This disclosure relates to a system and method for providing a recommendation for a game based on a game-centric relationship graph.

BACKGROUND ART

In typical social game environments, game users play games with and against other users via a network. In addition to gaming functions, many social gaming platforms provide various social networking functions that allow users to communicate with other users. For example, game users can participate in chatting with other game users in a game, share game data with other game users, and list other users as "friends" like other social networking services for enriched social networking activities.

Social media platforms such as social game platforms generally collect various types of information from users and aggregate such user information to infer relationships between users. The aggregated information and inferred relationships are often used to create recommendations or suggestions of new friends, new games, new items, and the like. Thus, the generated recommendations are provided to users for their ease of finding friends, games and/or items of their interests. Such aggregated information can be organized in the form of so-called "social graph" that represents social relationships between users. Conventionally, social media platforms leverage such "social graph" to create recommendations to their users.

Like other commercial items or contents, there are an enormous number of social game applications. Game users can download or access those game applications to play games via their electronic devices such as mobile phones, smartphones and/or other communication devices. As such, game users benefit from a recommender system that helps users effectively find games of their interests from such numerous options. Without any assistance from an automated recommender system, users would have to spend enormous time to find games that match their interests.

There are several known strategies for a content recommender system that can be implemented on social game platforms. One possible approach on a social game platform is to leverage a social graph to generate recommendation for a target game. Conventional social graph-based recommender systems generate recommendations relying on the assumption that users and their friends in close relationships in a social graph have common interests. For example, if a social graph shows that User A is a friend of User B and User B likes Game A, then a conventional recommender system utilizing the social graph provides a recommendation for the Game A to the User A. In this case, the Game A is recommended to the User A because a friend of User A (i.e., User B) likes the Game A and the recommender systems infers that the User A also likes the Game A.

However, there are limitations in the above conventional social graph-based recommender system because the relied-upon assumption that users have common interest with their real friends is not always true. As such, there is a need for a system and method for providing a recommendation for a game that match users' interests.

SUMMARY OF INVENTION

One aspect of the present disclosure relates to an automated recommender system for providing a recommendation for game to game users. In some embodiments, the recommendation may be determined based on a relationship graph. The relationship graph is a graph depicting relationships between game users. The relationships may be established via one or more games interacted or selected by those game users.

The relationship graph may be regarded as game-centric since game users (or nodes representing the users) in the relationship graph are connected with each other via one or more games (or nodes representing those games) of their interests. When two users are interested in a game (or interact with the game due to their interests in the game), those users are associated with one another in the relationship graph via the game. Thus, the relationship graph in some implementations may be generated so as to depict relationships between game users via one or more games of their common interests. It will be appreciated that whereas a conventional social graph typically depicts relationships between users so as to reflect their real relationships (e.g., a friend in the real world tends to be registered as a friend in the social graph), a game-centric relationship graph according to the disclosure may depict virtual relationships between game users having common interests in a given game.

In some implementations, the automated recommender system may leverage such a game-centric relationship graph to provide recommendations or suggestions for game to game users. As discussed below, the game-centric relationship graph may enable the recommender system to precisely infer users' interests in games because it is game-centric. It will be appreciated that games in the recommender system leveraging a game-centric relationship graph are not only critical elements of the relationship graph but also objects to be recommended to users.

As noted above, a game-centric relationship graph according to the disclosure may depict relationships between game users via one or more games of their common interests. To this end, a relationship graph in some implementations of the present disclosure may include a plurality of user nodes each representing a game user as well as a plurality of game nodes each representing a game. In a game-centric relationship graph in some implementations, each of the user node may be associated with one or more game nodes each representing a game based on users' interests in such a game. By way of example, a user node representing User A may be associated with a game node representing Game A in case that the User A is interested in the Game A to reflect the User A's interests. Thus, a game-centric relationship module may be generated such that one user node is associated with another user node via a game node of their common interests.

One of the plurality of users involved in a game-centric social graph may be regarded as a target user to whom a recommendation is provided. As used herein, a target user node in the relationship graph may refer to a node representing a target user to whom a recommendation is provided.

In some implementations, the target user node may be associated with one or more first layer game nodes each representing one of one or more first layer games. As used herein, a first layer game may be any kind of games such as a social game, a video game, an electronic game or an interactive game, but may be referred to as "first layer" game(s) as each node representing the first layer games are directly connected to the target user node. In one implementation, upon selection of a given game by the target user, the selected game may be added to the relationship graph as one of the first layer games. In particular, the selected game is added to the relationship graph such that the node representing the selected game is associated with the target user node.

In some implementations, the relationship graph also may include one or more first layer user nodes each representing one of one or more first layer users. Each of the first layer user nodes is associated with one or more of said one or more first layer game nodes. As used herein, a first layer user may refer to any game users who are interested in any one of the first layer games in the relationship graph. Accordingly, each of the first layer games is of common interest of both the target user and at least one of the first layer users.

In some implementations, the relationship graph also may include one or more second layer game nodes each representing one of one or more second layer games. Each of said one or more second layer game nodes may be associated with one or more of said first layer user nodes. As used herein, a second layer game may refer to any kind of games that any one of the first layer users is interested in. The second layer game may include a social game, a video game, an electronic game, and an interactive game, but may be referred to as "second layer" game(s) as each node representing one of the second layer games are indirectly connected to the target user via one of the first user nodes and one of the first layer game nodes. In one implementation, upon selection by one of the first layer users, the selected game may be added to the relationship graph as one of the second layer games such that the node representing the selected game is associated with one of the first layer user nodes representing the selecting user.

It should be noted that the target user node is not associated with any of the second layer game nodes. The second layer games are different from the first layer games in that the first layer games are of common interests of both the target user and the first layer user whereas the second layer games are of the first users' interests but not of the target user's interest at least until the second layer game is recommended to the target user.

In some implementations, the recommender system may identify one or more of said second layer games and provide a recommendation for the identified games to a client device of the target user. Upon receipt of the recommendation, the target user may play the recommended games via the client device. The recommended games are likely to be of the target user's interest since the recommended games are selected from the second layer games in which at least one of the first layer users is interested. That is, the thus recommended second games are likely to match the target user's interest as the target user and each of the first layer users are likely to have common interests with respect to selection of games.

In some implementations, the recommender system may comprise one or more processors. The one or more processors may be configured to execute one or more computer program modules. The one or more computer program modules may comprise one or more of a relationship graph module and a recommendation module. The relationship graph module may be configured to maintain a relationship graph. The relationship graph may include a target user node representing a target user; one or more first layer game nodes each representing one of one or more first layer games, wherein each of said one or more first layer game nodes is associated with the target user node; one or more first layer user nodes each representing one of one or more first layer users, wherein each of said one or more first layer user nodes is associated with one or more of said one or more first layer game nodes; and one or more second layer game nodes each representing one of one or more second layer games, wherein each of said one or more second layer game nodes is associated with one or more said first layer user nodes. The recommendation module may be configured to provide a recommendation identifying one or more of said second layer games to a client device of the target user.

Another aspect of the present disclosure relates to an automated recommendation method for providing a recommendation for a game to game users. In some embodiments, the recommendation method may comprise generating a relationship graph. The relationship graph in this implementation may be same as or similar to the relationship graph as noted above in connection with some implementations of the automated recommender system. The recommendation method may also comprise providing a recommendation identifying one or more of said second layer games to a client device of the target user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DESCRIPTION OF EMBODIMENTS

Figure 1:
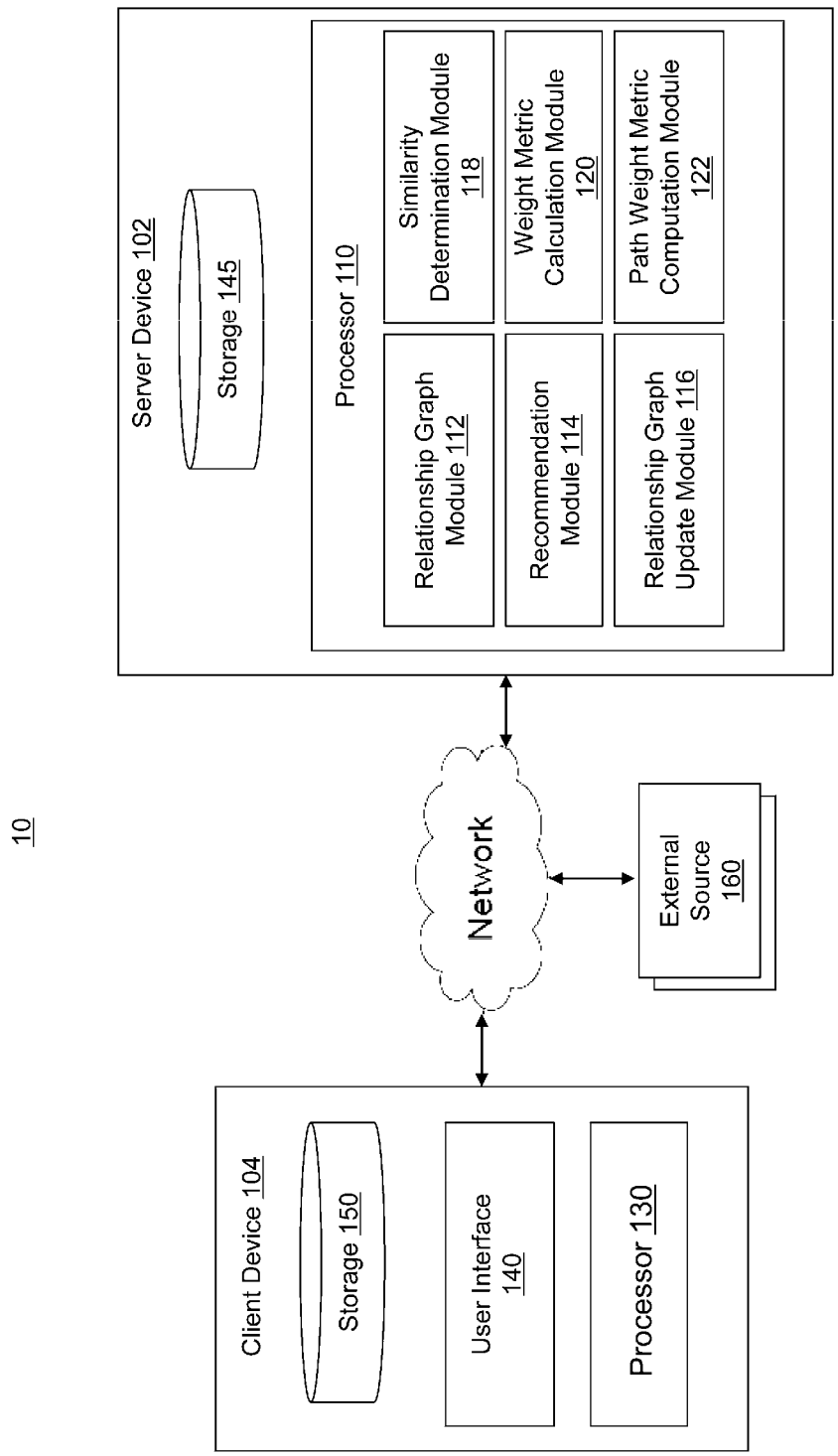
FIG. 1 shows a system configured to provide a recommendation for a game to game users, in accordance with one or more implementations.

FIG. 1 is a schematic illustration of a system 10 configured to provide a recommendation for a game to game users based on a game-centric relationship graph.

In some embodiments, the system 10 may include a server device 102 and a client device 104. The client device 104 may be communicatively connected with the server device 102 via a network such as the Internet. In some implementations, server device 102, client device 104, and/or external resources 160 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server device 102, client device 104, and/or external resources 160 may be operatively linked via some other communication media.

The client device may comprise a processor 130, a user interface 140, and storage 150. Users may interact with the system 10 via the client device 104. For example, user may interact with the system 10 via the user interface 140 by inputting various instructions and/or displaying various types of information retrieved from various components in the system 10 such as storage 150 or server device 102. In particular, users may access various game services provided by server 102 and play those games using various functions provided by the client device 104.

In some embodiments, the server device 102 may comprise a processor 110 and a storage 145. The storage 145 may comprise magnetic, electronic, optical and biological storage media that stores information. The storage 145 may store a variety of information including game application programs and related game data (e.g., game items, game points, user information, etc.). The storage 145 may also store data corresponding to a game-centric relationship graph in accordance with some implementations. The server device 102 may implement a game-centric relationship graph utilizing such data from the storage 145.

The processor 110 may be configured to execute one or more computer program modules. The computer program modules may include one or more of a relationship graph module 112, a recommendation module 114, a relationship graph update module 116, a similarity determination module 118, a weight metric calculation module 120, a path weight metric computation module 122, and/or other modules.

In some implementations, the relationship graph module 112 may be configured to generate and/or maintain a relationship graph. As noted above, the relationship graph may be a game-centric graph for depicting relationships between users of various games. The relationship graph according to one or more implementations of the present disclosure may be used to determine a recommendation for a game, which will be further discussed below.

Figure 2:
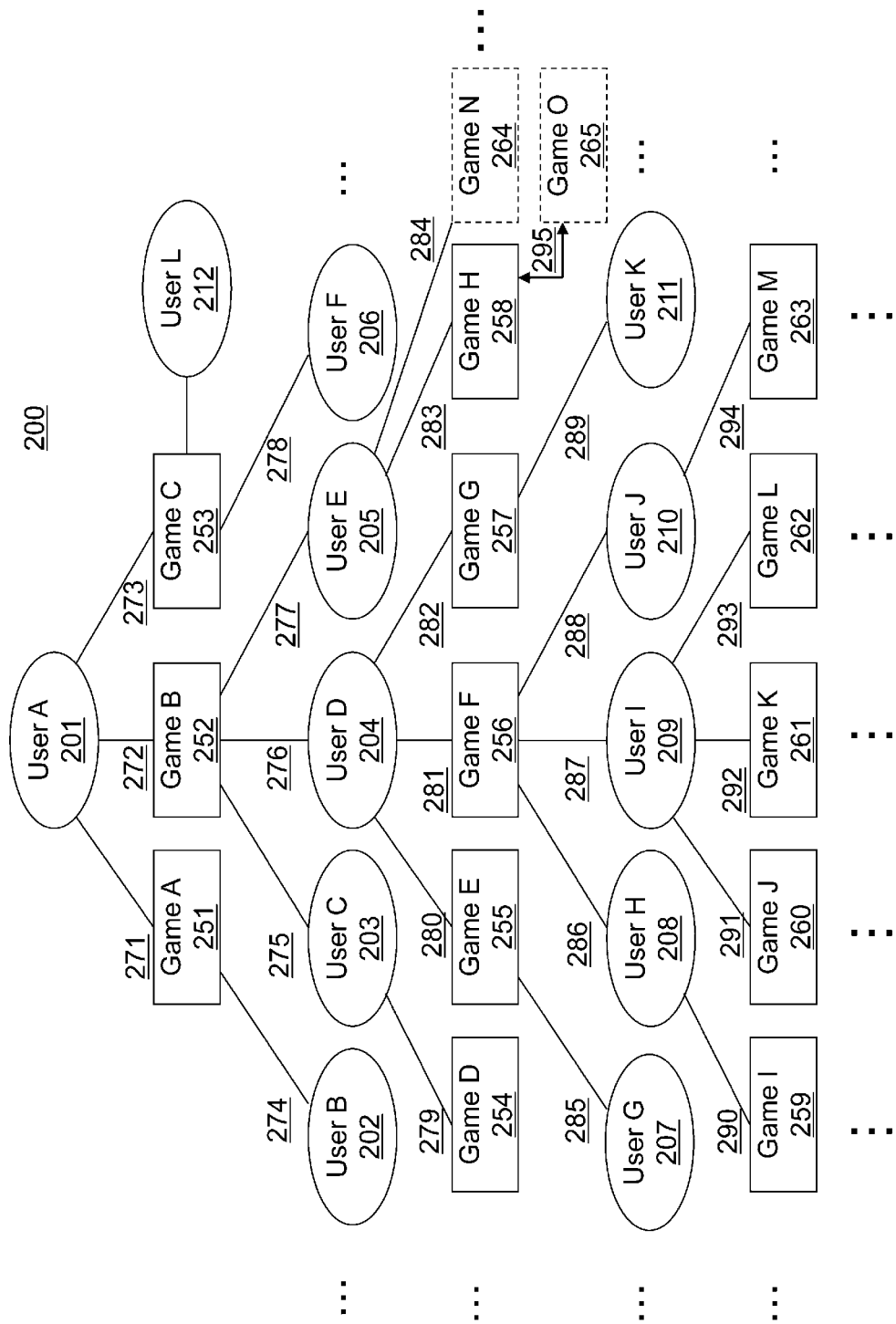
FIG. 2 illustrates an example of a relationship graph, in accordance with one or more implementations.

FIG. 2 shows an example of a relationship graph 200 in accordance with one or more implementations of the present disclosure. The relationship graph 200 may include a plurality of nodes and depict their relationships. As shown, the relationship graph 200 in FIG. 2 includes a plurality of user nodes 201-211, each of which represents a corresponding user of one or more social games. As used herein, a user node may refer to a kind of node in a relationship graph that may represent a user of one or more games. For example, user node 201 represents User A, user node 202 represents User B, and so on. It should be noted that the illustrated relationship graph 200 includes 12 user nodes for brief illustration purpose only. In FIG. 2, the relationship graph 200 may contain cycles as defined in graph theory. For example, Game B may be associated with User G which creates a cycle. However, it will be appreciated that this is not intended to be limiting, and that the relationship graph 200 may include any number of user nodes.

The relationship graph 200 is provided to illustrate an example where a recommendation for a game is provided to User A. In this regard, User A may be referred to as a target user in the illustrated embodiment.

The relationship graph also may include a plurality of game nodes. Each of the game nodes may represent any kind of games such as a social game, a video game, an electronic game or an interactive game. Such a game may be downloaded, installed, accessed, subscribed to, or other selected by one or more game users. As used herein, a game node may refer to a kind of node in a relationship graph representing any one of games involved in the relationship graph. Although the relationship graph 200 includes 15 game nodes, it will be appreciated that this is for brief illustration purpose only and not intended to be limiting. The relationship graph according to the present disclosure may include any number of game nodes.

In the illustrated relationship graph 200, each of the user nodes (e.g., user nodes 201, 202, . . . ) may be associated with one or more game nodes (e.g., game nodes 251, 252, . . . ). In some implementations, each of user nodes may be connected to one or more game nodes by a respective relationship branch. For example, the user node 201 representing User A is connected to each of the game nodes 251-253 via respective relationship branches 271-273. Relationship branches and weight metrics associated therewith will be discussed in detail hereinafter.

In the illustrated embodiments, game nodes 251, 252 and 253 each may be referred to as a first layer game node as they are directly connected to the target user node (i.e., user node 201 representing User A). Similarly, game nodes 254 through 258 (as well as game nodes 264 and 265) each may be regarded as a second layer game node as they are connected to the target user node via one of the first layer game nodes. For example, the game node 254 representing Game D is connected to the user node 203, which is then connected to the game node 252. The game node 252 is one of the first layer game nodes and, as such, directly connected to the target user node (i.e., user node 201). Thus, each of the second layer game nodes is indirectly connected to the target user node via one of the first layer game node. Similarly, game nodes 259 through 263 each may be regarded as a third layer game node as they are connected to the target user node via one of the first layer game nodes and one of the second layer game nodes. It will be appreciated that although the relationship graph in FIG. 2 illustrates three layers of game nodes, this is not intended to be limiting as the relationship graph 200 may include four or more layers of game nodes.

Like the layer structure of the game nodes, user nodes in the relationship graph may be configured to have a certain layer structure. For example, user nodes 202 through 206 may be regarded as a first user node. As shown, each of the first layer user nodes 202-206 may be associated with one or more of the first layer game nodes 251-253 and one or more of the second layer game nodes 254-258. For example, the user node 204 is associated with the first layer game node 252 and second layer game nodes 255-257. Similarly, user nodes 207-211 each may be regarded as a second layer user node. Each of the second layer game nodes may be associated with one or more of the second layer game nodes 254-258 and one or more of the third layer game nodes 259-263. It will be appreciated that although the relationship graph in FIG. 2 illustrates two layers of game nodes in addition to the target user node, this is not intended to be limiting as the relationship graph 200 may include three or more layers of user nodes.

The recommendation module 114 may be configured to identify one or more recommended games for the target user (User A). In one implementations, the recommendation module 114 may be configured to identify a recommended game based on a graph proximity to the target user node from the game nodes each representing candidate games. Any one of the games involved in a relationship graph may be treated as a candidate game except for the first layer games since the first layer game nodes are already associated with the target user node. In the illustrated embodiment, the recommendation module 114 may identify any one of the second layer games (Game D, Game E, Game F, Game G, or Game H (as well as Game N and Game O)) as recommended game(s) since the second layer game nodes 254-258 are more proximate to the target user node 201 in the illustrated relationship graph 200 as compared to the third layer game nodes 259-263. The recommendation module 114 may identify one or more of the second layer games as recommended games. Generally, the target user is more likely to play the recommended games of which game nodes are more proximate to the target user. However, the coverage (i.e. the number of candidate games (games that can be recommended to the target user)) may become lower as the game nodes are more proximate to the target user. With that, it is possible for the recommendation module 114 to identify any one of the second layer games (or games in deeper layers such as third layer games, fourth layer games, and so on) whether or not the first layer game nodes (or game nodes in shallower layers) are already associated with the target user node. For example, the recommendation module 114 may recommend one or more third layer game nodes even if not all the second layer games are associated with the target user node in order to increase the coverage of candidate games.

In some implementations, the relationship graph update module 116 may be configured to associate one or more of the game nodes corresponding to the identified games with the target user node 201. For example, if Game D is identified as a recommended game for the target user, the game node 254 corresponding to the Game D is associated with the target user node 201. It will be appreciated that, upon completion of the association of the game node 254 and the target node 201, the game node 254 may become one member of the first layer game nodes since it is directly connected to the target user node 201 and, as such, Game D will be excluded from the candidate games in determining recommended games next time.

Once the game node 254 is associated with the target user node 201, the Game D corresponding to the game node 254 may be provided to client device 104 used by the target user (User A). In some implementations, the recommendation may include a game ID for identifying the Game D, a link to a download page for Game D, and other information that may be used by the client device 104 or User A to download, access, install, subscribe, play or otherwise interact with the Game D.

If all of the second layer games are already recommended to the target user, the recommendation module 114 may identify any one of the third layer games (Game I, Game J, Game K, Game L, or Game M) as recommended game(s) since the third layer game nodes 259-263 are now the most proximate nodes to the target user node 201 in the illustrated relationship graph 200.

The similarity determination module 118 may be configured to calculate a similarity metric between a new game and each of the games involved in the relationship graph 200. A similarity metric may refer to a metric indicative of similarity between games. For example, a similarity metric may be determined such that two games have higher similarity if their game titles commonly have a same or similar term such as "dragon," or they are categorized in a same category such as a shooting game. In response to a new game being added to the relationship graph 200, the similarity determination module 118 may calculate a similarity metric between the new game and each of the existing games. For example, as shown in FIG. 2, when a new Game O is added to the relationship graph 200, the similarity determination module 118 may determine similarity metrics between the Game O and all games, Game A through Game M, and other existing games. The game node 265 corresponding to the Game O may be associated with the game node 258 corresponding to the Game H in case that the similarity metric between the Games H and O are higher than that of any other pairs. Thus, the new game node (e.g., game node 265) may be associated with one of the existing game nodes (i.e., first, second, or third layer games or games in a deeper layer) that represent a game having the greatest similarity metric with the new game. In some implementations, the association of the user node 265 with the game node 258 may be carried out for example by the relationship graph module 112. If the game node 265 corresponding to the Game O is associated with the game node 258 corresponding to the Game H, the Game O may be regarded as a part of the second layer games as with the associated Game H in determining the proximity to the target user node 201.

The similarity determination module 116 may determine that none of the existing games is similar enough to be associated with the new game. In that case, the new game is added to the relationship graph without any association with other game nodes.

As noted above, each of the user nodes and game nodes is associated or linked by a respective relationship branch. For example, the target user node 201 is linked with each of the first layer game nodes 251-253 by respective relationship branches 271-273. As used herein, relationship branches connecting the target user node 201 and the first layer game nodes may be referred to as "target user relationship branch." Similarly, the first layer user nodes 202-206 are linked to the corresponding first layer game nodes 251-253 by the respective relationship branches 274-278 as well as linked to the corresponding second layer game nodes 254-258 and 264 by the respective relationship branches 279-284. As used herein, relationship branches 274-284 extended from any one of the first layer user nodes 202-206 may be referred to as "first user relationship branch."

The weight metric calculation module 120 may be configured to calculate one or more of the weight metrics each associated with the target user relationship branches 271-273 and first user relationship branches 274-284.

In another implementation, the recommendation module 114 may identify a recommended game based on a mathematical score calculated from the weight metrics of the relationship branches. The weight metric of a relationship branch connecting one user node and one game node may be calculated based on interactions between the user corresponding to the linked user node with the game corresponding to the linked game node. For example, the weight metric of the relationship branch 271, which links the target node 201 and the game node 251, may be calculated based on interaction by the target User A with the Game A corresponding to the game node 251.

Weight metrics may be calculated in various manners so as to indicate the degree of interaction between a user and a game. For example, weight metrics may be calculated based on users' interaction with the platform on which a given game is provided, interaction with games, or both.

The weight metrics calculated based on the interaction by a specific user with some components or functions provided by a specific platform may be referred to as "platform metrics." The platform metrics may include one or more of "Impressions" (e.g. how many times an object corresponding to a specific game is displayed on screen), "Clicks" (e.g. how many times the user clicks on the object), "Coin-Consumption Spending" (e.g., the amount of game coins consumed by the user in connection with a specific game), and/or other metrics that may be calculated based on interaction by a specific user with the platform.

The weight metrics calculated based on the interaction by a specific user with a specific game is referred to as "in-game metrics." The in-game metrics may include one or more of "Play Frequency" (e.g., 3 times per day), "Play Duration" (e.g. 2 hours per day), "Purchase Frequency" (e.g., daily) and/or other metrics that may be calculated based on interaction by a specific user with a specific game.

The path weight metric computation module 122 may be configured to compute a respective path weight metric of each of relationship paths existing between the target user node 201 and each of the game nodes corresponding to candidate games existing in the relationship graph 200. The path weight metric of a specific path may be a function, such as the sum of the weight metrics of each of the branches that constitute the specific path. For example, assume that the recommendation module 114 selects one recommended game from the second layer games (Games D-H), each of the candidate games has their own paths that lead to the target user node 201. For example, the second layer game node 254 corresponding to the Game D is connected to the target user node 201 via the path including the branches 272, 275, and 279 each having a respective weight metric calculated by the weight metric calculation module 120. The path weight metric computation module 122 may compute the sum of those weight metrics associated with each branch constituting the path. Similarly, the path weight metric computation module 122 may compute other path weight metrics for the paths existing between the target user node 201 and other second layer game nodes 254-258 (as well as 264).

In some implementations, the recommendation module 114 may select one of the paths based on the computed path weight metric of each of the paths existing between the target user node 201 and each of the candidate game nodes. In some implementations, the recommendation module 114 may select one of the paths having the greatest path weight metric. Thus, the path weight metric enables the recommendation module 114 to enhance its recommendation by taking into account the weight metric (or path weight metric) that can indicate the strength of the connection between a particular user and a particular game.

In some implementations, the relationship graph 200 may evolve over time. For example, the relationship graph module 112 may add a new user to the relationship graph 200. To this end, the relationship graph module 112 may monitor interaction by a new user with each of the existing games in order to detect a selection of one of the existing games by such a new user. As will be appreciated, a new user may select one or more of the existing games in a various manner. For example, a new user may select one or more of the existing game by downloading, accessing, executing, or subscribing to such games. Upon selection of one of the existing games by a new user, the relationship graph module 112 may create a new user node representing the new user and associate the created new user node with the game node representing the selected game. For example, upon detection of selection from User L with Game C, the relationship graph module 112 may add the User L as a part of the relationship graph such that the new user node representing the User L (i.e., user node 212) is associated with the game node representing the Game C (i.e., game node 253) via a relationship branch.

In some implementations, the relationship graph module 112 may be configured to add a new game to the relationship graph 200. For example, the relationship graph module 112 may detect that one of the users involved in the relationship graph ("selecting user") has selected one or more new games that have not been contained in the relationship graph 200. Upon detection of selection of a new game by the selecting user, the relationship graph module 112 may add the new game to the relationship graph. The new game may be added to the relationship graph 200 such that the game node representing the new game node is associated with the user node representing the selecting user. The selecting user may be any one of the existing users in the relationship graph 200. For example, assume that the user node 205 representing User E is associated with the game nodes 252 and 258 (representing Game B and Game H, respectively) as shown in FIG. 2, the User E has selected a new game indicated as Game N by, for example, downloading the game program corresponding to the Game N, the relationship graph module 112 may add the Game N to the relationship graph 200 such that the game node 264 representing the Game N is associated with the user node 205 representing the selecting user (i.e., User E).

The external resources 160 may include sources of information, providers of content items outside of system 10, external entities participating with system 10, and/or other resources. In some implementations, some or all of the functionality attributed herein to external resources 160 may be provided by resources included in system 10.

It should be appreciated that although modules 112, 114, 116, 118, 120 and/or 122 are illustrated in FIG. 1 as being co-located within a single processing unit, in implementations in which processor 110 comprises multiple processing units, one or more of modules 112, 114, 116, 118, 120 and/or 122 may be located remotely from the other modules. The description of the functionality provided by the different modules 112, 114, 116, 118, 120 and/or 122 described above is for illustrative purposes, and is not intended to be limiting, as any of modules 112, 114, 116, 118, 120 and/or 122 may provide more or less functionality than is described. For example, one or more of modules 112, 114, 116, 118, 120 and/or 122 may be eliminated, and some or all of its functionality may be provided by other modules 112, 114, 116, 118, 120 and/or 122. As another example, processor 110 may be configured to execute one or more additional modules that may perform some or all of the functionality attributed to one of modules 112, 114, 116, 118, 120 and/or 122.

Figure 3:
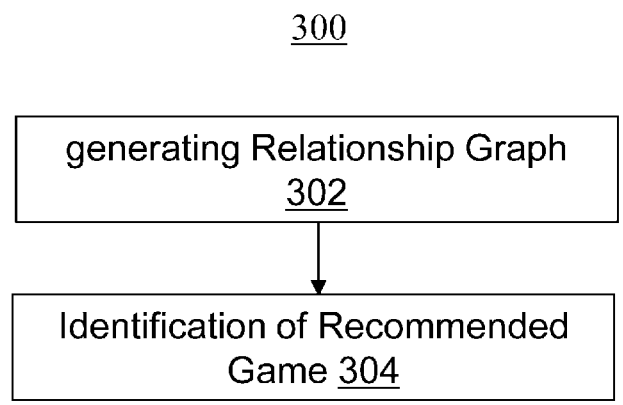
FIG. 3 illustrates an aspect of a method for providing a recommendation for a game to game users, in accordance with one or more implementations.

FIG. 3 illustrates a method 300 for providing a recommendation for a game to game users, in accordance with one or more implementations. Proposing a game to game users may be performed with a system comprising a server device and one or more client devices communicatively connected to the server. The relationship graph may be stored at and provided from a server device. The server device may comprise a processor and storage. The processors may be configured to execute computer program modules. The computer program modules at the client device may include a relationship graph module, a recommendation module, a relationship graph update module, a similarity determination module, a weight metric calculation module, and a path weight metric computation module. The operations of method 300 presented below are intended to be illustrative. In some implementations, method 300 may be accomplished with one or more additional operations not described, and with or without one or more of the operations discussed. Additionally, the order in which the operations of method 300 are illustrated in FIG. 3 and described herein is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on a storage medium. The one or more processing devices may include one or more devices configured through hardware, firmware, and/or software to be specifically designed for execution of one or more of the operations of method 300.

At an operation 302, one ore more game-centric relationship graphs may be generated. In some implementations, operation 302 may be performed by a server device 102 and a computer program module the same as or similar to relationship graph module 112 (shown in FIG. 1). An example of such a relationship graph is illustrated in FIG. 2. Once a relationship graph is generated, it may be updated over the time, for example, by adding a new user or a new game to the generated relationship graph.

At an operation 304, one or more games are identified as recommended games for a target user. The recommended games may be identified based on the game centric relationship graph generated or maintained in the operation 302. The identified games are provided to client device 104 associated with the target user.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

The invention claimed is:

1. A system for providing a recommendation for a game to game users, the system comprising one or more processors configured to execute computer program modules, the computer program modules comprising:
   a relationship graph module configured to maintain a relationship graph, the relationship graph including:
   a target user node representing a target user;
   one or more first layer game nodes each representing one of one or more first layer games, wherein each of said one or more first layer game nodes is associated with the target user node;
   one or more first layer user nodes each representing one of one or more first layer users, wherein each of said one or more first layer user nodes is associated with one or more of said one or more first layer game nodes; and
   one or more second layer game nodes each representing one of one or more second layer games, wherein each of said one or more second layer game nodes is associated with one or more said first layer user nodes; and
   a recommendation module configured to provide a recommendation identifying one or more of said second layer games to a client device of the target user.

2. The system of claim 1, wherein one or more of said one or more second layer game nodes each representing one of the recommended one or more second layer games are not associated with the target user node until the recommendation is provided to the client device.

3. The system of claim 1, further comprising:
   a relationship graph update module configured to associate one or more of the second layer game nodes each representing one of the recommended one or more second layer games with the target user node.

4. The system of claim 1, wherein the relationship graph module is further configured to add, upon selection of a new game by a selecting user, the new game to the relationship graph, the selecting user being either one of the target, first layer or second layer users.

5. The system of claim 4, wherein the relationship graph module is further configured to add the new game to the relationship graph such that a new game node representing the new game is associated with a selecting user node representing the selecting user.

6. The system of claim 5 further comprising:
   a similarity determination module configured to calculate a similarity metric between the new game and each of said one or more first layer games and second layer games; and
   wherein the relationship graph module is configured to add the new game to the relationship graph such that the new game is associated with one or more of said one or more first layer games or one or more of said second layer games based on the similarity metric.

7. The system of claim 1,
   wherein the target user node is associated with each of said one or more first layer game nodes via a respective one of target user relationship branches;
   wherein each of said one or more first layer user nodes is associated with one or more of said one or more first layer game nodes via a respective one of first user relationship branches;
   wherein at least one of said one or more first layer user nodes is associated with one or more of said one or more second layer game nodes;
   wherein each of the target user relationship branches and first user relationship branches is associated with a respective weight metric; and
   wherein the recommendation module is configured to identify the recommended one or more second layer games based on the weight metrics of each of the target user relationship branches and first user relationship branches.

8. The system of claim 1 further comprising:
   a weight metric calculation module configured to calculate one or more of the weight metrics each associated with the target user relationship branches and first user relationship branches.

9. The system of claim 8 further comprising:
   a path weight metric computation module configured to compute a respective path weight metric of each of relationship paths existing between the target user node and each of the second layer game nodes, each of the relationship paths including one of the target relationship branches and two of the first user relationship branches;
   wherein the recommendation module is configured to identify one of the second layer games based on the computed path weight metrics.

10. The system of claim 1,
    wherein the relationship graph further includes:

one or more second layer user nodes each representing one of one or more second layer users, wherein each of said one or more second layer user nodes is associated with one or more of said one or more second layer game nodes; and one or more third layer game nodes each representing one of one or more third game nodes, wherein each of said one or more third layer game nodes is associated with one or more said second layer user nodes; and wherein the recommendation module is configured to provide the recommendation identifying one or more of said third layer games if all of the second layer game nodes are associated with the target user node.

11. A method for providing a recommendation for a game to game users, the method comprising:

generating a relationship graph, the relationship graph including:

a target user node representing a target user;

one or more first layer game nodes each representing one of one or more first layer games, wherein each of said one or more first layer game nodes is associated with the target user node;

one or more first layer user nodes each representing one of one or more first layer users, wherein each of said one or more first layer user nodes is associated with one or more of said one or more first layer game nodes; and one or more second layer game nodes each representing one of one or more second layer games, wherein each of said one or more second layer game nodes is associated with one or more said first layer user nodes; and providing a recommendation identifying one or more of said second layer games to a client device of the target user.

* * * * *